United States Patent
Cuevas

[11] Patent Number: 5,806,883
[45] Date of Patent: Sep. 15, 1998

[54] STEERING WHEEL AND AIR BAG MODULE

[75] Inventor: Jess A. Cuevas, Scottsdale, Ariz.

[73] Assignee: TRW Inc., Lyndhurst, Ohio

[21] Appl. No.: 688,815

[22] Filed: Jul. 26, 1996

[51] Int. Cl.$^6$ ................................................. B60R 21/22
[52] U.S. Cl. ....................................... 280/731; 280/728.2
[58] Field of Search ............................... 280/731, 728.2, 280/741, 737

[56] References Cited

U.S. PATENT DOCUMENTS

| | | |
|---|---|---|
| 3,674,284 | 7/1972 | Lohr . |
| 3,768,824 | 10/1973 | Kloppe et al. . |
| 4,828,286 | 5/1989 | Fohl . |
| 5,221,109 | 6/1993 | Marchant ................................. 280/741 |
| 5,277,442 | 1/1994 | Cuevas . |
| 5,368,327 | 11/1994 | Shiraki et al. ........................... 280/731 |
| 5,382,046 | 1/1995 | Cuevas . |
| 5,470,099 | 11/1995 | Williams ................................. 280/731 |
| 5,553,888 | 9/1996 | Turner et al. ............................ 280/731 |
| 5,560,264 | 10/1996 | Xolin et al. ............................. 280/731 |

FOREIGN PATENT DOCUMENTS

| | | |
|---|---|---|
| 2109463 | 3/1972 | Germany . |
| 2359952 | 6/1974 | Germany ................................. 280/731 |
| 2500003 | 7/1975 | Germany ................................. 280/731 |
| 07196000 | 8/1995 | Japan . |
| 2282352 | 4/1995 | United Kingdom . |

*Primary Examiner*—Eric D. Culbreth
*Attorney, Agent, or Firm*—Tarolli, Sundheim, Covell, Tummino & Szabo

[57] ABSTRACT

A vehicle steering wheel assembly (20) includes a steering wheel frame (40) with a tubular core (42) and an actuatable inflator (82) to inflate an inflatable vehicle occupant protection device (84). The inflator (82) includes a container (100) which defines a chamber (120) for fluid under pressure and a portion (200) connectable to a steering shaft (26) of the vehicle. The container (100) is located within the tubular core (42) of the frame (40). The tubular core (42) engages a side wall (126) of the container (100) to reinforce the side wall against the pressure in the chamber (120). The inflator (82) is connected to the frame (40) by a connection, such as a portion (60) on the tubular core (42) deformed against the container (100).

13 Claims, 5 Drawing Sheets

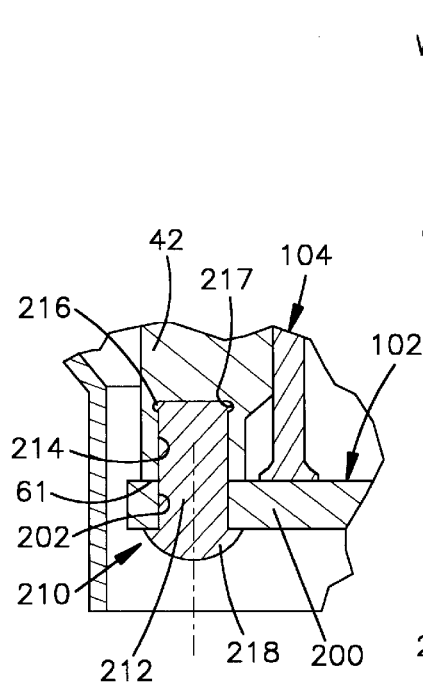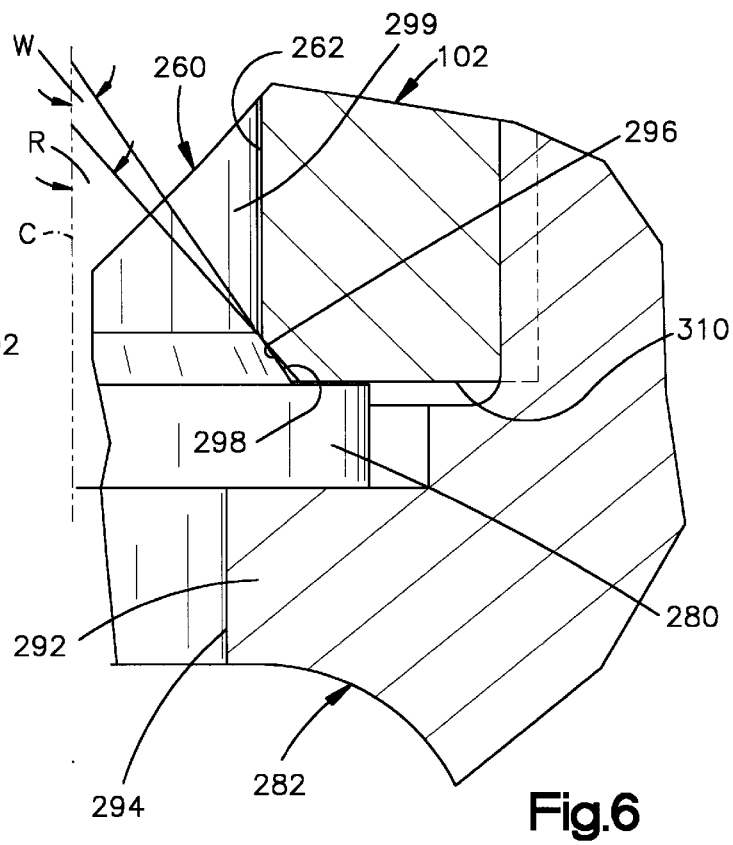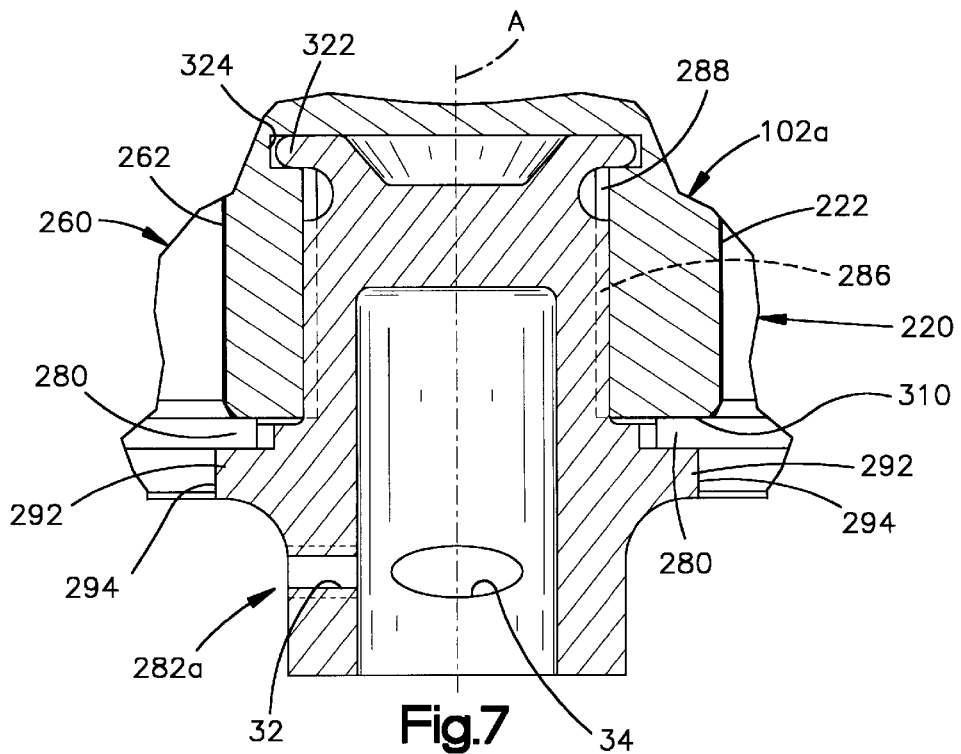

STEERING WHEEL AND AIR BAG MODULE

BACKGROUND OF THE INVENTION

1. Technical Field

The present invention relates to an inflator for inflating an inflatable vehicle occupant protection device. In particular, the present invention relates to a module, comprising an inflator and an inflatable vehicle occupant protection device, which is connected to a vehicle steering wheel.

2. Description of the Prior Art

Inflatable vehicle occupant protection devices, such as air bags, are known. The air bag is inflated by inflation fluid which is provided by an inflator. The air bag typically inflates to a location between the occupant and a vehicle part to protect the occupant from forcefully striking or being struck by the vehicle part.

The air bag and the inflator are commonly mounted on a plate to form a module. One type of module is attached to a vehicle steering wheel after the steering wheel is connected to a steering shaft in the vehicle.

The air bag and the inflator are typically attached to the plate with fasteners and a retainer. The fasteners extend through openings in the air bag, the inflator, the module plate and the retainer. Aligning the openings in all of these components to receive the fasteners can be cumbersome.

The inflator commonly includes a container which defines a chamber for storing inflation fluid under pressure. The walls of the container are relatively thick to withstand the pressure of the inflation fluid in the chamber. Also, some of the space within the steering wheel is not available to store inflation fluid because a side of the inflator must be spaced from a part of a frame of the steering wheel so at least a portion of the air bag can extend between the inflator and the frame.

SUMMARY OF THE INVENTION

The present invention is an apparatus comprising a vehicle steering wheel frame including a tubular core. An inflator for inflating an inflatable occupant protection device includes a container which defines a chamber and a portion which is connectable with a steering shaft of the vehicle. Inflation fluid is located under pressure in the chamber for inflating the protection device. The container is located within the tubular core of the steering wheel frame. The tubular core engages a side portion of the container to reinforce the side portion against the pressure force of the inflation fluid in the chamber. The apparatus further comprises means for connecting the inflator with the steering wheel frame.

In a preferred embodiment, the container has surface means for defining a first recess in the container. Actuatable means is located in the first recess and, when actuated, effects the flow of inflation fluid from the chamber to inflate the protection device. The actuatable means includes a projection. A lug connectable to a steering shaft of the vehicle includes a flange. The flange of the lug engages the projection of the actuatable means to retain the actuatable means in the recess.

BRIEF DESCRIPTION OF THE DRAWINGS

Further features and advantages of the present invention will become apparent to those skilled in the art to which the present invention relates from reading the following specification with reference to the accompanying drawings, in which:

FIG. 5 is an enlarged sectional view of an alternate connection between the air bag module and a frame of a steering wheel;

FIG. 6 is an enlarged sectional view of a portion of a lug of a container of FIG. 3 retaining an initiator in a recess in the container; and FIG. 7 is an enlarged sectional view of an alternate attachment between the lug and an inflator of the air bag module of FIG. 1.

DESCRIPTION OF A PREFERRED EMBODIMENT

Figure 1:
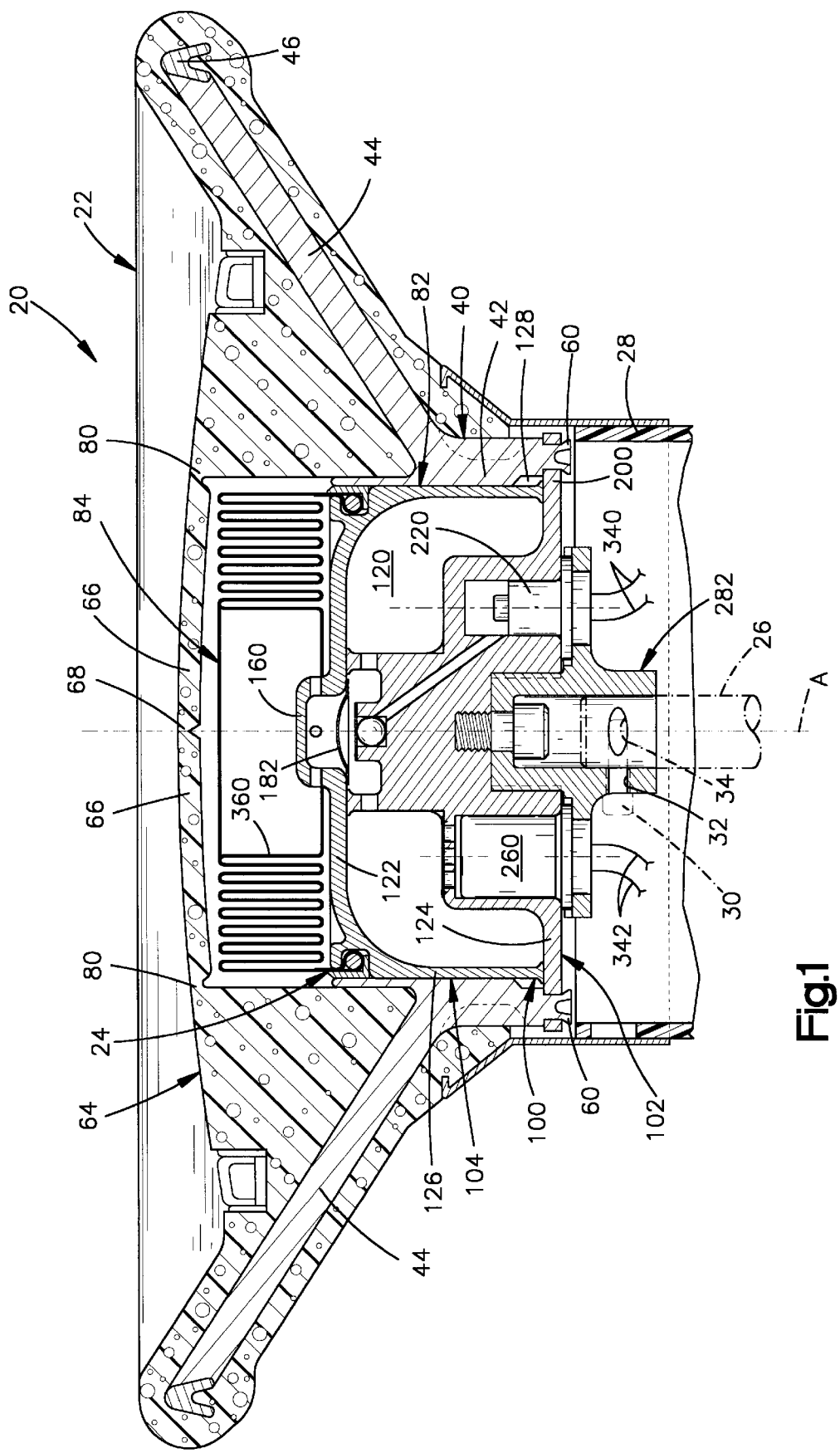
FIG. 1 is a sectional view of a vehicle steering wheel assembly embodying the present invention.

A vehicle steering wheel assembly 20 embodying the present invention is illustrated in FIG. 1. The steering wheel assembly 20 includes a steering wheel 22 and an air bag module 24 (FIGS. 1–4). The steering wheel assembly 20 is provided as a unit for connection to a steering shaft 26 (FIG. 1) which is located within a steering column of the vehicle.

The steering wheel assembly 20 is secured to the steering shaft 26 by a fastener 30. The fastener 30 is screwed into a threaded opening 32 in the air bag module 24. The fastener 30 extends into facing notches 34 formed in the air bag module 24 and in the steering shaft 26. When secured to the steering shaft 26 by the fastener 30, the steering wheel assembly 20 is rotatable with the steering shaft 26 about a longitudinal central axis A of the steering shaft to control the direction of vehicle travel.

Figure 2:
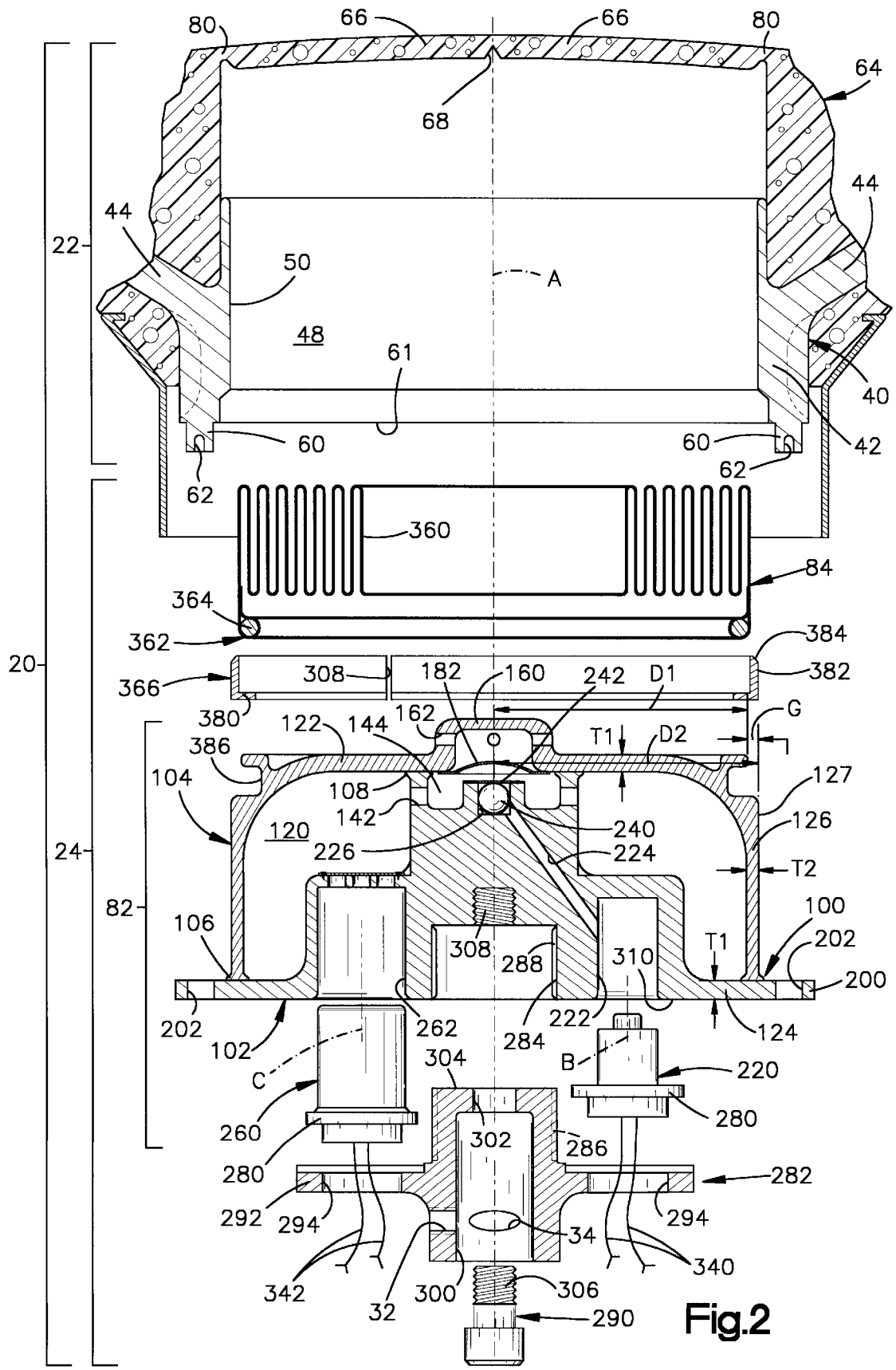
FIG. 2 is an exploded sectional view of a portion of the steering wheel assembly of FIG. 1.

The steering wheel 22 includes a frame 40 (FIGS. 1–2). The frame 40 preferably is a metal structure with a centrally located tubular core 42. A plurality of spokes 44 extend outward from the tubular core 42 and are welded to a rim 46 (FIG. 1) of the steering wheel 22. The rim 46 is substantially circular in shape and is centered on the axis A. A substantially cylindrical cavity 48 (FIG. 2) is defined by a cylindrical inner surface 50 of the tubular core 42 of the frame 40.

A plurality of projections 60 are disposed in a circular array and extend downward from a lower (as viewed in FIG. 2) end surface 61 of the tubular core 42. The projections 60 connect the air bag module 24 to the frame 40 of the steering wheel 22. The projections 60 are substantially cylindrical in shape prior to connecting the air bag module 24 to the steering wheel frame 40. An end portion of each projection 60 has a hollow recess 62 (FIGS. 2–3) which enables the projection to be deformed during an assembly operation, in a manner described below, to secure the module 24 for movement with the steering wheel frame 40.

Figure 3:
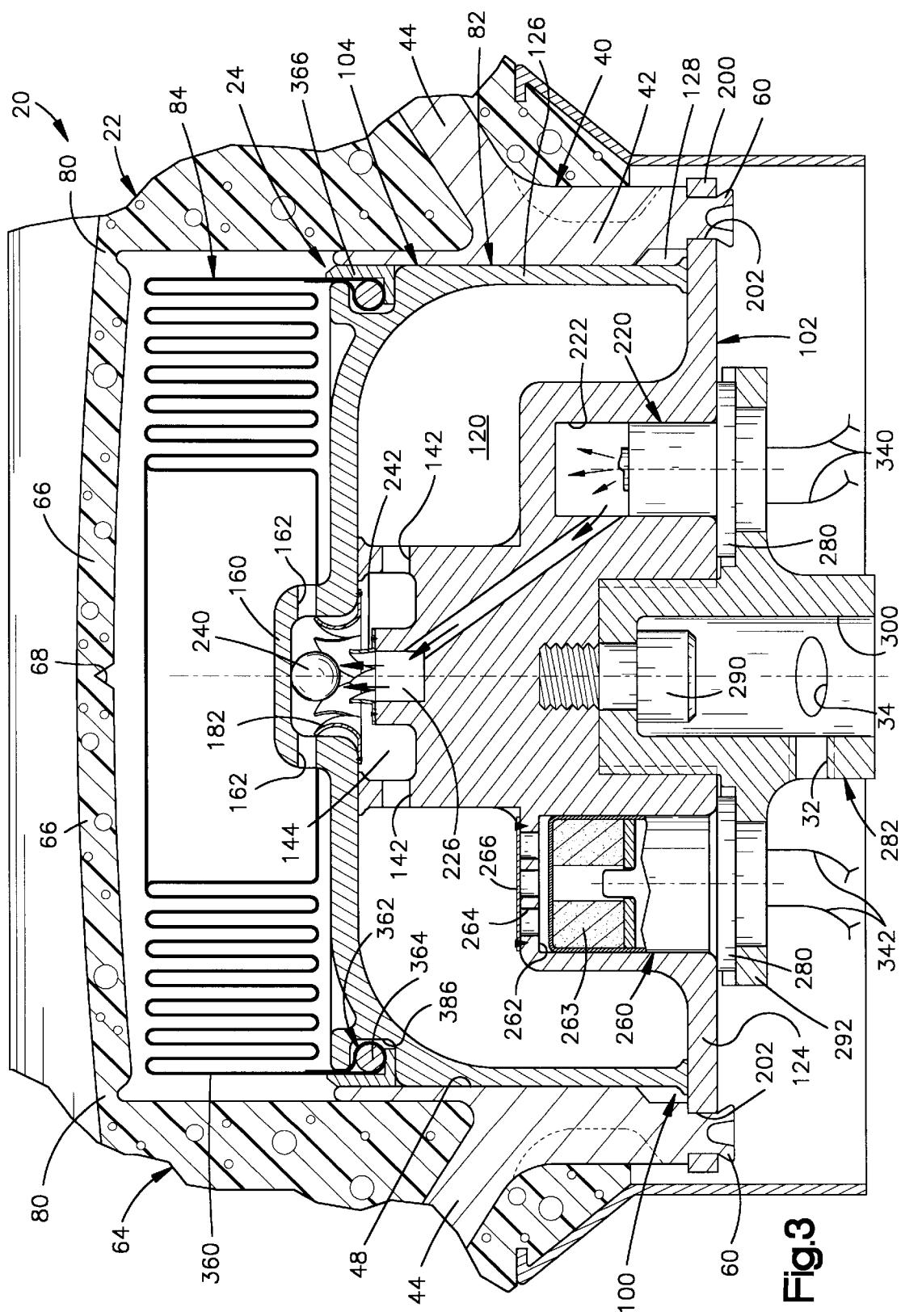
FIG. 3 is an enlarged sectional view of a portion of the steering wheel assembly of FIG. 1 with parts of an air bag module in different conditions.

The steering wheel 22 also includes a plastic cover 64 (FIG. 1) which encapsulates a majority of the exterior of the frame 40. The cover 64 has a pair of deployment door panels 66 which are held in initially closed positions, as illustrated in FIGS. 1–3, by a rupturable central section 68. The deployment door panels 66 are pivotable in an outward direction at hinge portions 80, from the position illustrated in FIGS. 1–3 to the position illustrated in FIG. 4, upon actuation of the module 24.

The air bag module 24 includes an inflator 82 (best seen in FIG. 2) and an inflatable vehicle occupant protection device 84 of the type commonly known as an air bag. The air bag 84 is directly mounted on an upper end portion of the inflator 82, as viewed in FIGS. 1, 3 and 4. The inflator 82 is directly connected to the frame 40 of the steering wheel 22. The steering wheel assembly 20 thus has a simple structure which is relatively easy to assemble.

The inflator 82 is actuatable to provide inflation fluid for inflating the air bag 84. The inflator 82 is a dual stage inflator which is capable of providing a tailored fluid pressure profile in the air bag 84 as a function of time. The inflator 82 includes a container 100 (FIG. 2) that is centered on the axis A. The container 100 includes a flanged metal inner housing 102 and a cup-shaped metal outer housing 104 which radially surrounds most of the inner housing. The outer housing 104 is fixed to the inner housing 102 in a suitable manner, such as by continuous friction welds 106, 108 at axially and radially spaced locations. The weld 106 is located at the juncture of the flange of the inner housing 102 and the lip of the cup-shaped outer housing 104. The weld 108 is located at the juncture of the base of the cup-shaped outer housing 104 and one axial end of the inner housing 102. When the inner housing 102 and the outer housing 104 are fixed together, they define a substantially toroidal shaped chamber 120 in the container 100.

Inflation fluid under pressure is stored in the chamber 120 of the container 100. The inflation fluid preferably is a known substantially non-ignitable inert gas, such as argon or nitrogen, or a combination of inert gasses. The inflation fluid is stored within the chamber 120 at a pressure which is at least about 2,000 psi. The chamber 120 of the inflator 82 may alternatively contain a pressurized mixture of gases in which at least one of the gases is combustible, or an ignitable solid pyrotechnic material which burns to produce an inflation gas.

The container 100 is relatively short, measured in a direction parallel to the axis A, and is substantially cylindrical. The container 100 includes a pair of spaced apart end walls 122, 124 (FIG. 2) which are connected by a circumferentially continuous side wall 126. The side wall 126 has a cylindrical outer surface 127. The end walls 122, 124 have substantially equal first thicknesses T1, measured in a direction parallel to the axis A. The side wall 126 has a second thickness T2, measured in a radial direction from the axis A, which is less than either of the first thicknesses T1.

The container 100 is located within the cavity 48 defined by the tubular core 42 of the frame 40 (FIGS. 1 and 3). The inner surface 50 of the tubular core 42 engages the outer surface 127 of the side wall 126 of the container 100 over substantially its entire outer periphery. The tubular core 42 does not engage the side wall 126 of the container 100 at a relatively small annular clearance void 128 formed in the tubular core. The clearance void 128 assures that flash from the weld 106 does not interfere with insertion of the inflator 82 into the cavity 48 of the tubular core 42.

The side wall 126 of the container 100 is reinforced by the tubular core 42 against the force exerted by the fluid under pressure in the chamber 120. The side wall 126 of the container 100 thus can be provided with the relatively thin thickness T2 to minimize weight of the inflator 82 and to maximize space to store inflation fluid within the inflator. Furthermore, a maximum volume of inflation fluid is provided within the steering wheel 22 because the inflator 82 occupies all of the space that is available in the cavity 48 of the tubular core 42 for storing inflation fluid.

Figure 4:
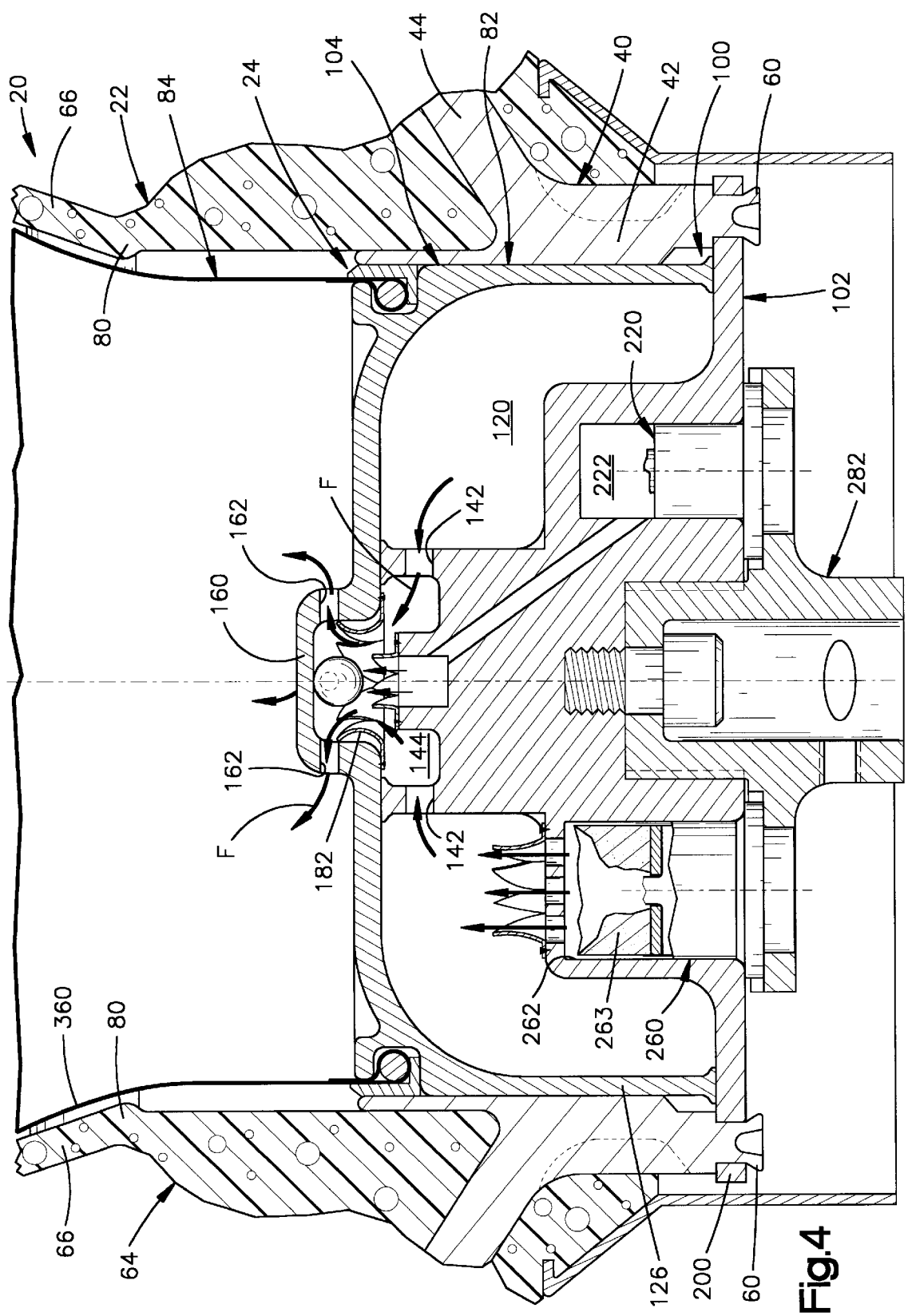
FIG. 4 is a view similar to FIG. 3 with parts of the air bag module in different conditions.

The inner housing 102 of the container 100 has a plurality of radially extending flow passages 142 (FIGS. 2–4). The flow passages 142 permit fluid communication between the chamber 120 and a central chamber 144 which is located entirely inside of the inner housing 102. The flow passages 142 direct inflation fluid from the chamber 120 into the central chamber 144 to inflate the air bag 84.

A cylindrical shaped diffuser 160 is formed in the end wall 122 of the outer housing 104, as viewed in FIGS. 2–3, and is centered on the axis A. The diffuser 160 includes a plurality of circular passages 162 which direct the flow of inflation fluid from the diffuser into the air bag 84. The passages 162 are arranged in a circumferential array about the diffuser 160. The inflation fluid, as indicated by the reference character F in FIG. 4, is directed from the inflator 82 by the passages 162 to inflate the air bag 84.

A closure 182 (FIG. 2) is fixed to the outer housing 104 adjacent the diffuser 160. The closure 182 is located along the axis A and cooperates with the inner housing 102 to define the central chamber 144. The closure 182 blocks the flow of inflation fluid from the central chamber 144, and thus the chamber 120, when the closure is unruptured. The closure 182 may be scored or weakened, as is known in the art, in order to rupture easily in a predetermined manner. When the closure 182 is ruptured, inflation fluid flows from the chamber 120, through the flow passages 142, to the central chamber 144, into the diffuser 160, through the passages 162, and into the air bag 84.

A connecting portion 200 (FIGS. 2–4) of the end wall 124 of the inner housing 102 of the container 100 is located radially outward of the side wall 126 of the outer housing 104. The connecting portion 200 directly connects the inflator 82 and thus the air bag module 24 to the tubular core 42 of the frame 40 of the steering wheel 22. The connecting portion 200 of the container 100 includes a plurality of circular openings 202. The openings 202 are disposed in a circular array near the outer edge of the connecting portion 200 in a pattern and size to match the projections 60 on the tubular core 42 of the frame 40. The openings 202 extend completely through the connecting portion 200 of the container 100.

During an assembly operation, the inflator 82 of the air bag module 24 is moved into the cavity 48 of the tubular core 42. The openings 202 in the connecting portion 200 of the container 100 are aligned with the projections 60 of the tubular core 42. When an upper surface of the connecting portion 200 engages the lower end surface 61 of the tubular core 42, the projections 60 extend through the openings 202. The lowermost ends of the projections 60, as viewed in FIG. 3, are thereafter deformed radially outward against the connecting portion 200 to connect the inflator 82 of the module 24 directly to the frame 40 of the steering wheel 22. The projections 60 may thereafter be deformed inward from their connecting condition to enable the inflator 82 and air bag module 24 to be removed from the steering wheel 22 and replaced if necessary.

An alternate structure 210 for connecting the inflator 82 of the air bag module 24 to the tubular core 42 of the frame 40 is illustrated in FIG. 5. The alternate structure 210 includes the same openings 202 in the connecting portion 200 of the inner housing 102 of the inflator 82. A plurality of rivets 212 extend through the openings 202 in the connecting portion 200 of the inner housing 102 of the container 100. The rivets 212 are located in openings 214 formed in the tubular core 42 of the frame 40 and are fixed by a deformable upper end portion 216 that extends into a radial groove 217, as viewed in FIG. 5, in the tubular core. When the connecting portion 200 of the inner housing 102 engages the lower end surface 61 of the tubular core 42, lower end portions 218 of the rivets 212 are deformed to maintain the inflator 82 engaged with the lower end surface of the tubular core.

An actuatable initiator 220 (FIG. 2) is located in a recess 222 in the inner housing 102 of the container 100. The initiator 220 and the recess 222 are centered on a longitudinal central axis B which extends in a direction parallel to the axis A. The axis B is radially offset from the axis A.

A passage 224 (FIG. 2) extends at an angle through the inner housing 102 between the recess 222 and a cylindrical rupture chamber 226. The passage 224 communicates the combustion products from the initiator 220 in the recess 222 to the rupture chamber 226. The rupture chamber 226 is located along the axis A and is axially spaced from the closure 182.

A spherical member 240 is located in the rupture chamber 226. The spherical member 240 is movable from a position in the rupture chamber 226, as illustrated in FIGS. 1–2 to a position in the diffuser 160, as illustrated in FIG. 3, in response to actuation of the initiator 220. The spherical member 240 is preferably a stainless steel ball that closely fits within the rupture chamber 226.

A rupturable membrane 242 is attached to the inner housing 102 above the rupture chamber 226. The membrane 242 maintains the spherical member 240 within the rupture chamber 226. Prior to actuation of the initiator 220, the membrane 242 prevents unintended rupturing of the closure 182 and seals the central chamber 144 from the rupture chamber 226 and thus the recess 222. The membrane 242 is made from relatively thin metal. The membrane 242 ruptures upon movement of the spherical member 240 from the position in the rupture chamber 226 illustrated in FIGS. 1–2 toward the position illustrated in FIG. 3, in response to actuation of the initiator 220. After the spherical member 240 ruptures the membrane 242, the spherical member moves to strike and rupture the closure 182. The spherical member 240 is then contained within the diffuser 160.

A second actuatable initiator 260 (FIG. 2) is located in a second recess 262 in the inner housing 102 of the container 100. The second initiator 260 and the second recess 262 have a longitudinal central axis C which extends in a direction parallel to the axis A. The axis C is radially offset from the axis A.

The initiator 260 is larger than the initiator 220 and includes, in addition to its regular pyrotechnic charge, an ignitable pyrotechnic material 263 (FIG. 3). Upon actuation, the initiator 260 produces combustion products which ignite the pyrotechnic material 263. The pyrotechnic material 263 burns to produce further combustion products, including heat, which are released into the recess 262.

Passages 264 are formed in the inner housing 102 and extend in a direction substantially parallel to the axis C. The passages 264 permit fluid communication between the recess 262 and the chamber 120. A rupturable membrane 266 is fixed to the inner housing 102 by a laser weld and initially seals the passages 264 and thus seals the chamber 120 from the recess 262.

The membrane 266 ruptures in response to actuation of the second initiator 260 when the pressure of the combustion products in the recess 262 increases to a predetermined pressure. Once the membrane 266 is ruptured, the combustion products produced by the initiator 260 flow through the passages 264 into the chamber 120 to heat the inflation fluid. If the chamber 120 is filled with a mixture of gases including a combustible gas, only a relatively small amount of pyrotechnic material is needed to ignite the combustible gas in the mixture of gases.

Each one of the initiators 220, 260 includes a respective projection 280 (FIGS. 2, 3, 6 and 7) extending radially outward from the axes B, C. Each projection 280 extends continuously and circumferentially around its corresponding initiator 220, 260.

The inflator 84 includes a lug 282 which is connectable to the vehicle steering shaft 26. A portion of the lug 282 extends into a central recess 284 in the inner housing 102 of the container 100. The lug 282 has splines 286 which cooperate with splines 288 in the central recess 284 to block relative rotation between the lug and the container 100. The lug 282 is attached to the inner housing 102 of the container 100 of the inflator 84 by a threaded fastener 290 to block relative axial movement between the lug and the container.

The lug 282 includes a flange 292 extending radially outward. The flange 292 of the lug 282 has a pair of openings 294. A portion of each of the initiators 220, 260 is received in a respective one of the openings 294. The flange 292 engages a lower radial surface on each of the projections 280 of the initiators 220, 260 over their entire circumferences when the lug 282 is attached to the inner housing 102 of the container 100. The flange 292 of the lug 282 thus retains the initiators 220, 260 in their respective recesses 222, 262.

The inner housing 102 of the container 100 has a frustoconical chamfered edge 296 (FIG. 6) at the lower end of each of the recesses 222, 262 (only recess 262 is shown in FIG. 6). The edge 296 is disposed at an acute angle R relative to the longitudinal central axes B, C (only axis C is shown in FIG. 6) of the recesses 222, 262. Each of the initiators 220, 260 (only initiator 260 is shown in FIG. 6) includes a frustoconical transition surface 298 located between the projection 284 and a body 299 of the initiator. The transition surface 298 is disposed at an acute angle W relative to the axes B, C of the recesses 222, 262. The acute angle W is a less than the acute angle R. The transition surface 298 of each of the initiators 220, 260 is thus in continuous line contact with the edge 296 adjacent a respective one of the recesses 222, 262 to seal the recesses from the environment surrounding the inflator 82.

The fastener 290 (FIGS. 2 and 3) extends through a hollow central portion 300 of the lug 282 and an opening 302 in an end 304 of the lug. A threaded portion 306 of the fastener 290 is screwed into a threaded opening 308 in the inner housing 102 to draw the lug 282 into the central recess 284 of the inner housing. The projections 280 of the initiators 220, 260 are thus forced against a bottom surface 310 of the inner housing 102 and the initiators are held in the recesses 222, 262 by the lug 282. The fastener 290 assures that no relative axial movement occurs between the inner housing 102 and the lug 282.

An alternate attachment of a modified lug 282a and a modified inner housing 102a is illustrated in FIG. 7. The alternate attachment includes a deformable upper end portion 322 on the lug 282a. The end portion 322 deforms outwardly into a groove 324, as the lug 282a is drawn into the inner housing 102a, to retain the lug in the inner housing.

The initiator 220 (FIG. 1) is attached to a controller (not shown) by lead wires 340. The initiator 260 is also connected to the controller, by lead wires 342. The controller is in electrical communication with at least one sensor (not shown), such as a deceleration sensor. When the sensor communicates a signal to the controller indicating that a collision or a deceleration of the vehicle above a predetermined threshold has started, for which inflation of the air bag 84 is desired, the controller triggers or actuates at least one of the initiators 220, 260.

The controller uses a signal from the sensor to calculate if and how much of a time delay is to occur between actuation of the initiator 220 and actuation of the initiator 260. This time delay enables the inflator 82 to provide a tailored fluid pressure profile in the air bag 84 as a function of time dependent upon at least one of various factors, such as occupant weight, distance from the air bag, position or orientation on a vehicle seat, vehicle speed, severity of the crash, temperature within the passenger compartment and the like. Any or all of these factors can be used by the controller to calculate the time delay for actuating the second initiator after actuation of the first initiator. More than one sensor would be necessary and would be in communication with the controller if more than one factor was being used by the controller to calculate the time delay.

The air bag 84 of the air bag module 24 may be made from any suitable fabric material, such as woven nylon. The air bag 84 (FIGS. 1–4) includes a relatively large inflatable portion 360. A mounting portion 362 (FIG. 2) of the air bag 84 includes a bead 364 for securing the air bag to the inflator 82. The bead 364 may be molded as part of the mounting portion 362 or may be a separate part sewn into the mounting portion, as illustrated in FIGS. 1–4.

The air bag module 24 includes a guide ring 366 (FIG. 2) for securing the air bag 84 to the inflator 82. The guide ring 366 also guides movement of the air bag module 24 into the cavity 48 in the tubular core 42 of the frame 40 during an assembly operation. The guide ring 366 is an annular member with an L-shaped cross-section, viewed in a plane which extends radially from the axis A.

The guide ring 366 has an axially extending split 308 that allows circumferential and diametral expansion to position the guide ring around the inflator 82 and air bag 84. The guide ring 366 is preferably made from a relatively low friction material, such as polytetrafluoroethylene. The guide ring 366 includes a base portion 380 and a wall portion 382. The wall portion 382 of the guide ring has a chamfered leading edge 384 which centers the air bag module 24 in the cavity 48 of the tubular core 42 during movement of the air bag module into the cavity.

The air bag 84 is attached to the inflator 82 by placing the bead 364 of the mounting portion 362 of the air bag over the upper end of the inflator 82, as viewed in FIGS. 2–3. The bead 364 of the mounting portion 362 is received in an upper portion of an annular groove 386 in the container 100 of the inflator 82, as viewed in FIG. 3. The upper end or downwardly facing radial surface of the groove 386, as viewed in FIG. 2, has a diameter D1 which is smaller than a diameter D2 of a lower end or upwardly facing radial surface of the groove. The difference between the diameters D1 and D2 produces a gap G through which the air bag 84 and guide ring 366 extend once they are mounted to the inflator 82.

The wall portion 382 of the guide ring 366 is placed around the mounting portion 362 of the air bag 84. The base portion 380 of the guide ring 366 is received in a lower portion of the groove 386 and the wall portion 382 engages the mounting portion 362 of the air bag 84. The resilience of the guide ring 366 retains the mounting portion 362 of the air bag 84 in the groove 386 until the air bag module 24 is located in the tubular core 42. After the air bag module 24 is located in the tubular core 42 of the frame 40, the tubular core engages the wall portion 382 of the guide ring 366 to assure that the bead 364 and mounting portion 362 of the air bag 84 remain in the groove 386 in the inflator 82.

In operation, the controller has at least one signal communicated from the sensor, which may be indicative of the occurrence of a collision or deceleration above the predetermined deceleration for which inflation of the air bag 84 is desired. Other conditions may also be sensed and input to the controller. The controller then calculates a time delay, if any, between actuation of the initiator 220 and the actuation of the initiator 260.

The initiator 220 is actuated to effect rupturing of the closure 182 by releasing combustion products into the recess 222. The combustion products are communicated from the recess 222 to the rupture chamber 226 through the passage 224. The combustion products force the spherical member 240 to rupture the membrane 242 and move out of the rupture chamber 226 to rupture the closure 182, as illustrated in FIG. 3. When the closure 182 is ruptured, inflation fluid starts to flow from the chamber 120, through the flow passages 142, into the central chamber 144, and into the diffuser 160. The inflation fluid then exits the diffuser 160 through the passages 162 and is directed into the air bag 84 to inflate the air bag.

Simultaneously with or slightly after actuation of the initiator 220, the initiator 260 is actuated. The time of actuation of the initiator 260 is controlled by the controller to tailor the fluid pressure profile in the air bag 84 as a function of time. Combustion products produced by burning of the pyrotechnic material 263 are released into the recess 262. The pressure of the combustion products in the recess 262 ruptures the membrane 266. The combustion products are directed through the passages 264 into the chamber 120 to heat the inflation fluid in the chamber, as illustrated in FIG. 4.

The heated inflation fluid F then flows through the flow passages 142, into the central chamber 144, and into the diffuser 160. The heated inflation fluid F then exits the diffuser 160 through the passages 162 and is directed into the inflatable portion 360 of the air bag 84 with a desired pressure profile as a function of time. The inflatable portion 360 of the air bag 84 begins to inflate and is forced against the inside of the cover 64. The inflating inflatable portion 360 of the air bag 84 ruptures the central section 68 of the cover 64 and moves the deployment door panels 66 to pivot outward about the hinge portions 80, as illustrated in FIG. 4. The air bag 84 expands outward from the steering wheel 22 past the deployment door panels 66.

The air bag 84 inflates from a folded, uninflated condition, as illustrated in FIGS. 1 and 3 to a position between the steering wheel 22 and an occupant of the vehicle, such as the driver of the vehicle. The inflated air bag 84 helps to protect the occupant from forcefully striking or being struck by the steering wheel 22 or other parts of the vehicle. After the air bag 84 is fully inflated and inflation of the air bag is no longer desired, the air bag deflates in a known manner.

From the above description of the invention, those skilled in the art will perceive improvements, changes and modifications in the invention. Such improvements, changes and modifications within the skill of the art are intended to be covered by the appended claims.

Having described the invention, I claim:

1. An apparatus comprising:
   a vehicle steering wheel frame including a tubular core;
   an inflator for inflating an inflatable vehicle occupant protection device, said inflator including (a) a container which defines a chamber and (b) a portion which is connectable with a steering shaft of the vehicle;
   inflation fluid under pressure in the chamber for inflating the protection device, the pressure force of said inflation fluid acting against a portion of a side wall of said container;

said container being located within said tubular core of said steering wheel frame, said tubular core engaging said portion of said side wall of said container against which the pressure force of said inflation fluid acts to reinforce said side wall against the pressure force of said inflation fluid in the chamber;

means for connecting said inflator with said steering wheel frame; and further including an inflatable occupant protection device and means for mounting said protection device to said inflator, said mounting means including a surface means defining a groove in said container, a mounting portion of said protection device in a first portion of the groove, and a guide ring having a base portion in a second portion of the groove and a wall portion retaining said mounting portion of said protection device in said first portion of the groove.

2. The apparatus of claim 1 wherein said wall portion of said guide ring engages said tubular core of said steering wheel frame to retain said mounting portion of said protection device in the groove in said container.

3. An apparatus for inflating an inflatable vehicle occupant protection device, said apparatus comprising:

a container defining a chamber for material which is used to inflate the protection device, said container having surface means for defining a first recess in said container;

actuatable means in the first recess for, when actuated, effecting the flow of inflation fluid from the chamber to inflate the protection device, said actuatable means including a projection;

a lug connectable to a steering shaft of the vehicle, said lug including a flange; and means for attaching said lug to said container, said flange of said lug engaging said projection of said actuatable means to retain said actuatable means in the recess.

4. The apparatus of claim 3, wherein said means for attaching said lug to said container comprises means for preventing relative rotation between said container and said lug and means for preventing relative axial movement between said inflator and said lug.

5. The apparatus of claim 3 wherein said container further includes surface means for defining a second recess in said container, said apparatus including second actuatable means in the second recess for producing combustion products which are releasable into the chamber upon actuation of said second actuatable means.

6. The apparatus of claim 3 wherein said surface means for defining a first recess in said container includes a chamfered edge extending at a first acute angle relative to a longitudinal central axis of the first recess, said actuatable means having a transition surface which extends relative to the longitudinal central axis of the first recess at a second acute angle less than the first acute angle, said chamfered edge on said container engaging said transition surface on said actuatable means to provide line contact between said container and said actuatable means.

7. An apparatus comprising:

a vehicle steering wheel frame including a tubular core;

an inflatable vehicle occupant protection device including a mounting portion;

an actuatable inflator which, upon actuation, provides fluid to inflate said protection device, said inflator comprising a container defining a chamber containing inflation fluid under pressure, said container having portions defining a recess in said container;

said container being located in said tubular core of said steering wheel frame with said tubular core engaging a side of said container to reinforce said container side against the pressure force of said fluid in the chamber;

means for connecting said inflator to said steering wheel frame, said connecting means including a portion on one of said container and said tubular core deformed into engagement with the other of said container and said tubular core;

means for mounting said inflatable device to said inflator, said mounting means including a groove in said container and a guide ring, said mounting portion of said protection device being located in the groove, said guide ring having a base portion in the groove and a wall portion retaining said mounting portion of said protection device in the groove;

actuatable means in said recess for, when actuated, effecting the flow of inflation fluid from said container to inflate the protection device, said actuatable means including a projection;

a lug connectable to a steering shaft of the vehicle, said lug including a flange; and means for attaching said lug to said container, said flange of said lug engaging said projection of said actuatable means to retain said actuatable means in the recess.

8. The apparatus of claim 7 wherein said container includes a pair of spaced apart end walls connected by said side, said side having a peripheral surface extending between said end walls, said end walls having a first thickness and said side having a second thickness which is less than the first thickness, said side being engaged by said tubular core over substantially the entire peripheral surface of said side.

9. The apparatus of claim 7 wherein said deformed portion comprises at least one projection extending from an end of said tubular core of said steering wheel frame and through an opening in said container, said projection being deformed against a surface of said container.

10. The apparatus of claim 7 wherein the groove is formed in an outwardly facing end portion of said container.

11. The apparatus of claim 7 wherein said guide ring includes a tapered leading end which guides movement of said inflator into said tubular core of said steering wheel frame, said wall portion of said guide ring engaging said tubular core of said steering wheel frame to hold said mounting portion of said protection device in the groove in said container.

12. An apparatus comprising:

a vehicle steering wheel frame including a tubular core;

an inflator for inflating an inflatable vehicle occupant protection device, said inflator including (a) a container which defines a chamber and (b) a portion which is connectable with a steering shaft of the vehicle;

inflation fluid under pressure in the chamber for inflating the protection device, the pressure force of said inflation fluid acting against a portion of a side wall of said container;

said container being located within said tubular core of said steering wheel frame, said tubular core engaging said portion of said side wall of said container against which the pressure force of said inflation fluid acts to reinforce said side wall against the pressure force of said inflation fluid in the chamber;

means for connecting said inflator with said steering wheel frame; and means for defining a recess in said container, an actuatable member in the recess and having a projection, a lug connectable to the steering shaft of the vehicle and having a flange, and means for attaching said lug to said container, said flange of said lug engaging said projection of said actuatable member to retain said actuatable member in the recess.

13. An apparatus comprising:

a vehicle steering wheel frame including a tubular core;

an inflator for inflating an inflatable vehicle occupant protection device, said inflator including (a) a container which defines a chamber and (b) a portion which is connectable with a steering shaft of the vehicle;

inflation fluid under pressure in the chamber for inflating the protection device, the pressure force of said inflation fluid acting against a portion of a side wall of said container;

said container being located within said tubular core of said steering wheel frame, said tubular core engaging said portion of said side wall of said container against which the pressure force of said inflation fluid acts to reinforce said side wall against the pressure force of said inflation fluid in the chamber; and means for connecting said inflator with said steering wheel frame;

said means for connecting said inflator with said steering wheel frame comprising at least one projection which extends from an end of said tubular core of said steering wheel frame and through an opening in a portion of said container, said projection being deformable against a surface of said portion of said container to block movement of said container relative to said steering wheel frame.

* * * * *